United States Patent [19]

Fukai et al.

[11] Patent Number: 4,542,452

[45] Date of Patent: Sep. 17, 1985

[54] PROGRAMMABLE CONTROLLER

[75] Inventors: Yoshio Fukai; Masato Yamamoto; Masuo Hanawaka, all of Tokyo, Japan

[73] Assignee: Yokogawa Hokushin Electric Corporation, Tokyo, Japan

[21] Appl. No.: 605,778

[22] Filed: May 1, 1984

Related U.S. Application Data

[63] Continuation of Ser. No. 275,678, Jun. 22, 1981, abandoned.

[30] Foreign Application Priority Data

Jun. 25, 1980 [JP] Japan .................... 55-86333
Jun. 25, 1980 [JP] Japan .................... 55-86336

[51] Int. Cl.$^4$ .................... G05B 15/02; G05B 19/02
[52] U.S. Cl. .................... 364/141; 364/146; 364/162; 364/186; 364/189
[58] Field of Search .................... 364/140–147, 364/162, 171, 174, 186, 188, 189, 200 MS File, 900 MS File

[56] References Cited

U.S. PATENT DOCUMENTS

| | | | |
|---|---|---|---|
| 4,028,682 | 6/1977 | Weber et al. | 364/900 |
| 4,038,533 | 7/1977 | Dummermuth et al. | 364/900 |
| 4,064,394 | 12/1977 | Allen | 364/189 |
| 4,091,446 | 5/1978 | Demonte et al. | 364/200 |
| 4,129,862 | 12/1978 | Kaplan et al. | 377/17 |
| 4,138,718 | 2/1979 | Toke et al. | 364/146 |
| 4,200,915 | 4/1980 | Struger et al. | 364/900 |
| 4,215,398 | 7/1980 | Burkett et al. | 364/141 |
| 4,303,973 | 12/1981 | Williamson, Jr. et al. | 364/138 |
| 4,371,922 | 2/1983 | Fujita et al. | 364/144 |
| 4,385,349 | 5/1983 | Ashford et al. | 364/186 |
| 4,390,942 | 6/1983 | de Kezir | 364/162 |
| 4,418,381 | 11/1983 | Molusis et al. | 364/188 |
| 4,431,988 | 2/1984 | Molusis et al. | 364/712 |

Primary Examiner—Jerry Smith
Assistant Examiner—John R. Lastova
Attorney, Agent, or Firm—Parmelee, Bollinger & Bramblett

[57] ABSTRACT

A programmable controller is provided with a controller body including a microprocessor having a ROM for storing user programs connected with a socket thereto. A programmer which is connected by a connector to a data bus or the controller body has a means to switch to a program mode to write a user program in a RAM by operating keys, and a test run mode to execute the user program written in RAM on the controller body, and a means to copy the user program written in RAM of the programmer to said ROM. The user program stored in ROM which is inserted in said socket is executed when the programmer is isolated from the controller body. The system program of the controller body includes a basic control function program for executing a single loop control, a cascade control function program for executing the cascade control and a selective control function program for the selective control, so that the control operation function is decided by selecting one of said control operation functions programs by a single instruction of the user programs.

8 Claims, 22 Drawing Figures

FIG.5

| CLASSIFICATION | NAME | SIGN |
|---|---|---|
| Computational Functions | Addition | + |
| | Subtraction | − |
| | Multiplication | * |
| | Division | ÷ |
| | Square-root Extraction | √ |
| | Absolute Value | ABS |
| | Segment Function Generation | FX |
| | High Selector | HSL |
| | Low Selector | LSL |
| | High Limiter | HLM |
| | Low Limiter | LLM |
| | Velocity Limiter | VLM |
| | First Order Lag Time | LAG |
| | Lead Time | LED |
| | Dead Time | DED |
| | Velocity | VEL |
| | Comparison | CMP |
| | High Limit Alarm | HAL |
| | Low Limit Alarm | LAL |
| | Branch Digital Input | BDI |
| | Branch Digital Output | BDO |
| | Set Digital Output | SDO |
| | Reset Digital Output | RDO |
| | Count Pulse Output | CPO |
| Control Functions | Basic Control | BSC |
| | Cascade Control | CSC |
| | Signal Selector Control | SSC |

| Program Step | Program and Key | Description |
|---|---|---|
| 01 | L D  X  1 | Read in Analog Input x |
| 02 | L D  P  1 | Read in Variable $\alpha$ |
| 03 | * | Calculate $\alpha \times x$ |
| 04 | L D  P  2 | Read in Variable $\beta$ |
| 05 | + | Calculate $\alpha x + \beta$ |
| 06 | BSC | Perform Basic Control |
| 07 | S T  Y  1 | Output Control Output to Output 1 |
| 08 | END | End |

| Program Step | Program and Key | Description |
|---|---|---|
| 01 | [LD] [X] [1] | Read in Flow Signal |
| 02 | [√] | Calculate Square Root |
| 03 | [LD] [X] [2] | Read in Liquid Level Signal |
| 04 | [SSC] | Perform Signal Selector Control |
| 05 | [ST] [Y] [1] | Output Control Output to Output 1 |
| 06 | [END] | End |

FIG.19

```
        Step    Instruction   Number
```

| | Key | Programmer Display |
|---|---|---|
| (a) | K 1 1 . 0 0 0 E | K 1    1.0 0 0 |
| (b) | K 4 0 (-) 1 . 0 0 0 E | K 4 0 -1.0 0 0 |

FIG.21

| | Key | Programmer Display |
|---|---|---|
| (a) | X 1 | X 1 H -1.0 0 0 |
| (b) | ENT | X 1 L  0.0 0 0 |

PROGRAMMABLE CONTROLLER

This application is a continuation of application Ser. No. 275,678, filed June 22, 1981, and now abandoned.

BACKGROUND OF THE INVENTION

The invention relates to a programmable controller to which a microprocessor is applied.

The latest situation is such that a process must be controlled in higher precision than ever before so as to cope with requirements for energy saving, resources saving and environmental pollution prevention. In the field of process control consequently, that of digital-control operation system to which a microprocessor is applied as disclosed in the specification of U.S. Pat. No. 4,141,065 has been developed to practice instead of a conventional analog-control operation system. The microprocessor-applied controller then has an advantage that, even though it is not referred to in the specification of U.S. Pat. No. 4,141,065, various control operations can be executed by a single hardware according to user programs, and various complementary operations can also be executed according to user programs in addition to control operations.

Now, a programmer to compose programs will be necessary before a user programmable controller is obtained. Programs are then composed generally by means of program languages like FORTRAN, BASIC, etc., therefore a considerably high extent of grammar and a tool using large computers such as compiler and generator will be necessary. Therefore, all users are not necessarily capable of composing programs freely, and there may be a case where such program as is not to be opened outside for the sake of their own know-how on control must be placed for with manufacturers. In view of the situation above, a development of such programmable controller has been desired as will enable the users to compose programs freely and also to use programs coping with a moderate system like microprocessor-applied system. The programmable controller put to practical use is constituted such that the program of the operation function required for the control operations is divided into various operation blocks, a performance number given to each of them for working as a single instruction of the user program and a given control operation is extended by combining them in the user program. For PID operation, for example, the user program is standardized for combination of PID operation block to apply a control operation to a deviation between measured value PV and set value SV, a limiter block to limit upper and lower bounds of an output of PID operation block, and a manual/automatic changeover switch to obtain an operation output MV through changing an output of the limiter block and an output of manual actuator, and also for combination of a tracking processing to change manual/automatic in balanceless and bumpless, a processing incidental to a change of internal setting and external setting, and a processing on displays of PV, SV, MV. There prepared further are PID operation block with batch and sample value PI operation block besides PID operation block, thereby constituting various programs for control operation. Thus the system wherein the function program of control operation is given in the element of various operation blocks for combination is applicable in various transforms, however, it involves a hardship that a lack of particular knowledge on control is not for the user program assembling, and a complicatedness was quite unavoidable with programs for cascade control and selective control, accordingly. Furthermore, programming was required in each occasion for control operations of a constitution, which was really troublesome.

For user programs composed according to an object of control, tests are necessary, prior to commencing control actually, to ensure that a control program conforms to specified requirements, the control program functions normally to obtain an objective control result and that an initial value of control parameter is correctly set and hardware operates normally. To carry out the tests, a control object model (hereinafter referred to as "process model") to mimic the control object is prepared in most cases and connected to the controller, which is actuated. Ths is called simulation. Simulation is taken customarily as a separate one from function of the controller, and thus a designer of the controller must prepare a suitable process model as occasion demands. To cope with the circumstances, a process simulator to approximate the process in a time lag of higher order system has been produced, however, its simple function program is not to cater for the process complicated more and more. There is a case where a complicated process model is made out and tested in software in the computer control system, however, its technique has not yet been standardized for popular use.

Furthermore, control parameters such as proportional zone P, integrating time I and differentiating time D which are used in the process control system are desirable to be nonvolatile. Since a conventional analog controller is available for setting by volume, the above requirements are satisfied. However, the situation is such that an external setting of parameters is required as seen in a remote control of parameters through communication and an adaptive control from systems of higher order, and a setting element is on the way to shift from volume to memory element. There work various kinds of writable nonvolatile memories including core, however, RAM (random access memory) ready for read/write is preferable and thus popular in respect of cost and performance in a small system like microprocessor-applied controller. However, RAM is volatile and thus involves a shortcoming that contents of the memory disappear inevitably from a device main supply coming off. A battery backup system is therefore conceivable but not perfect. If RAM volatilizes for some cause, then it cannot restart until parameters are set again.

SUMMARY OF THE INVENTION

The principal object of this invention is to provide a new programmable controller having a controller body and a programmer, which is free from the shortcoming pointed out as above.

Another object of the invention is to provide a programmable controller, having a function program of a control operation to input a measured value and output a manipulated variable concentrated on three function programs in comprising a basic control function program, cascade control function program and selective control function program, thereby programming in the sense of selecting an analog controller with each basic control function program as one instruction of the user program.

Still another object of the invention is to provide a programmable controller easy to test thereby without requiring any particular simulation.

A further object of the invention is to provide a programmable controller capable of restarting quickly and safely through arrangement wherein an initial value for parameter tuning can automatically be reset when the parameter volatilizes.

BRIEF DESCRIPTION OF THE DRAWINGS

FIG. 5 is a table giving operation functions and control functions in a controller according to the invention.

FIG. 19 gives an example of displays of a programmer in a controller according to the invention.

FIG. 20 is a diagram of a fixed constant setting operation in a controller according to the invention.

FIG. 21 is a diagram of an engineering data display operation in a controller according to the invention.

DESCRIPTION OF THE PREFERRED EMBODIMENT

Figure 1:
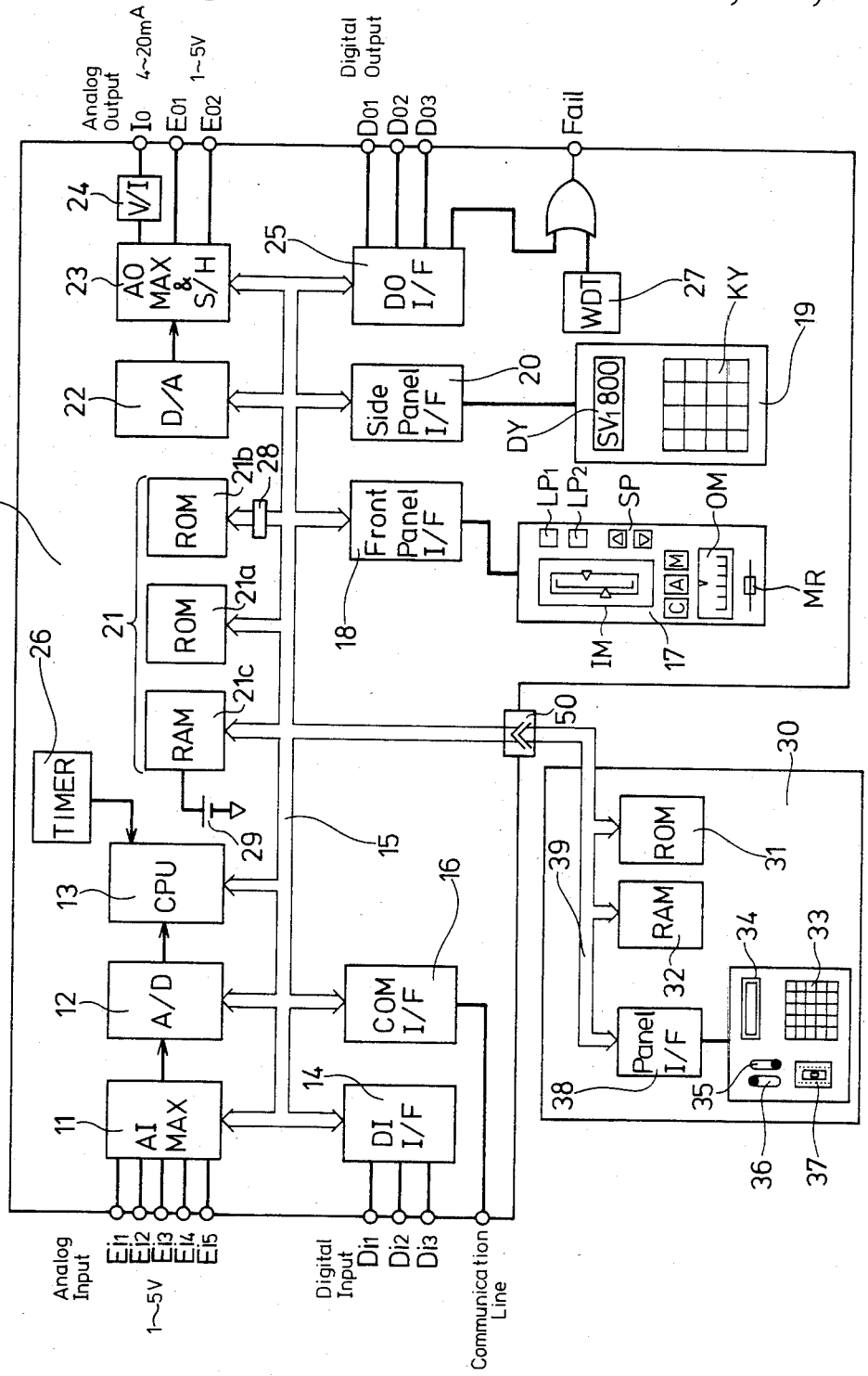
FIG. 1 is a block diagram representing one embodiment of a controller according to this invention.
Figure 2:
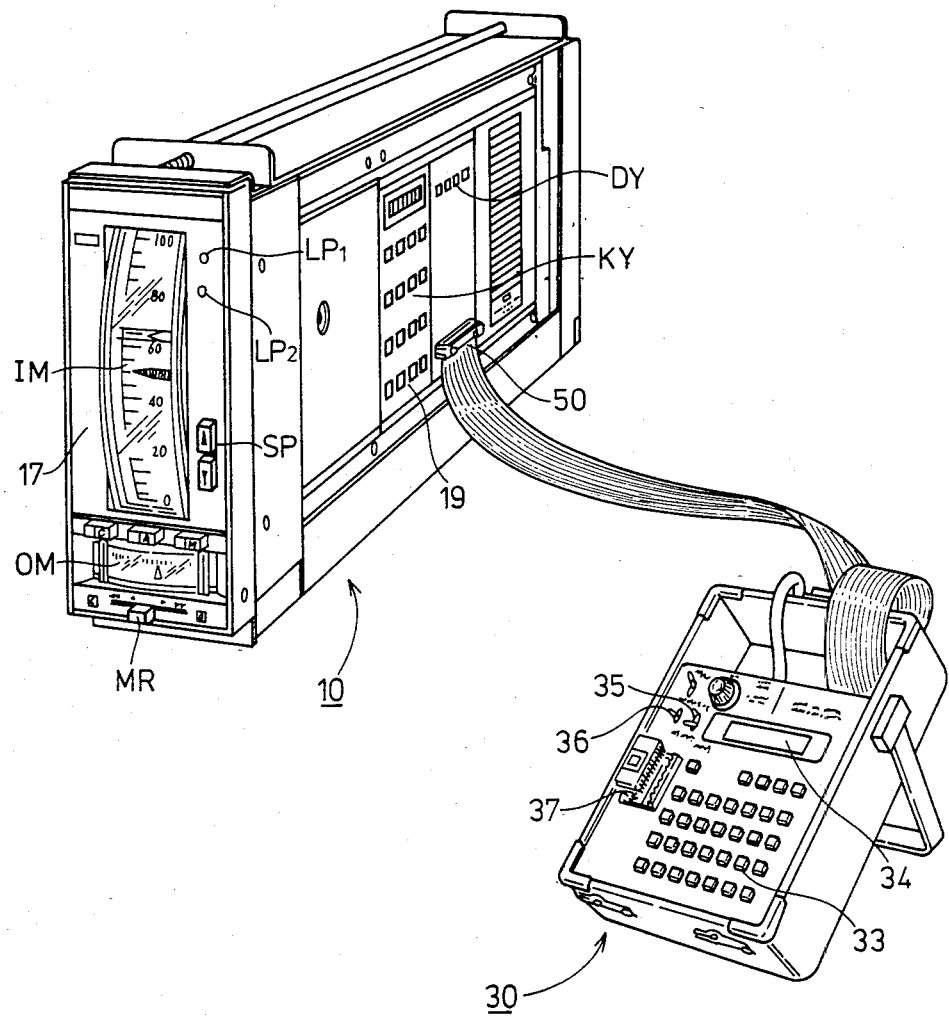
FIG. 2 is a surface appearance view of a controller given in one embodiment of the invention.

FIG. 1 is a block diagram representing one embodiment of a controller according to this invention; FIG. 2 is a surface appearance view thereof. As will be apparent from the drawings, the present invention comprises a controller body 10 and a programmer 30, the programmer 30 being connected detachably to the controller body 10 with a connector 50.

In the controller body 10, analog inputs $E_{i1} \sim E_{i5}$ of measured value and correcting temperature and pressure are inputted to an A/D converter 12 successively through an input multiplexer 11 and then taken into a microprocessor (hereinafter referred to as CPU) 13 through digital conversion. On the other hand, digital inputs $D_{i1} \sim D_{i3}$ necessary for sequential processing or operation switching are taken into CPU 13 through a digital input interface 14 by way of a data bus 15. Then, communication with an upper computer or operator console is carried out similarly through a communication interface 16. Those of front panel interface 18 with displays IM, OM, set value adjusting button SP, operation mode changeover push-button switches A, M, C and operating output adjusting lever MR on a front panel 17 and of side panel interface 20 with keyboard KY and display DY on a side panel 19 for setting various control parameters and variable parameters and displaying input/output values are also carried out by way of the data bus 15. A result obtained through carrying out various operations according to a program stored in a memory 21 is once converted into an analog output at DC $1 \sim 5$ V on a D/A converter 22 and then held in an output sample holding circuit 23 until next update time. Then, output of the controller is normally a current output for valve operation, therefore one of outputs of the sample holding circuit 23 is outgoing as a current Io at DC $4 \sim 20$ mA through a voltage/current converter 24. Various status outputs are then outgoing through a digital output interface 25.

A timer 26 controls a scanning period (0.2 sec.) of operation, and a clock working on crystal vibrator is used as a fundamental clock, which issues a timer interrupt signal to CPU at every 0.2 sec. A watchdog timer 27 operates when CPU does not work normally for abnormity of CPU or program: it issues a fail signal "Fail" externally when abnormity has been detected and a fail lamp $LP_1$ provided on the front panel lights up to display accordingly. There is provided an alarm lamp $LP_2$ on the front panel 17, which lights up when analog inputs $E_{i1} \sim E_{i5}$ have exceeded a level $-5\%$ to $105\%$.

Figure 3:
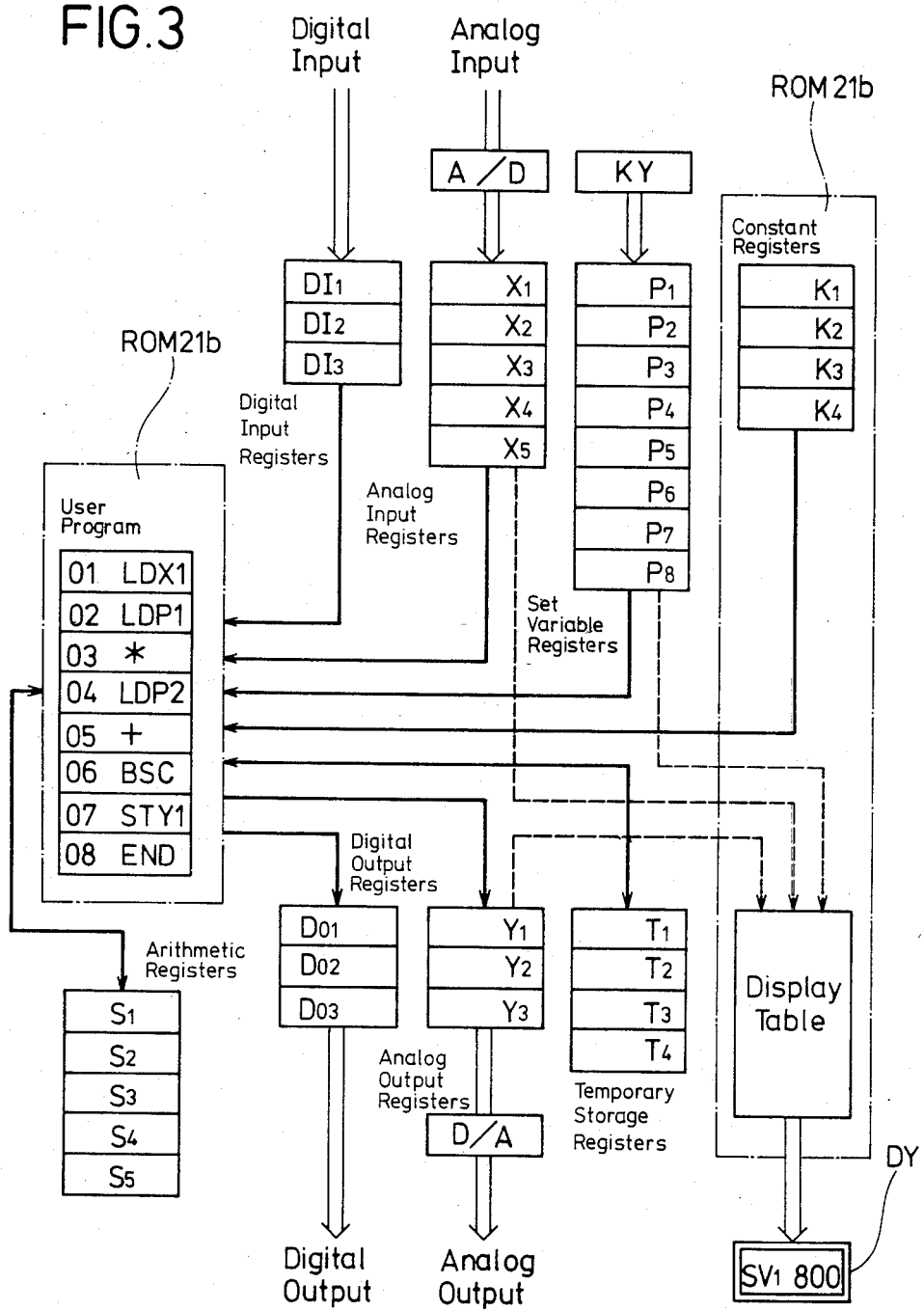
FIG. 3 is a block diagram of registers in a controller according to the invention.

CPU 13 operates for control of input/output multiplexer, control of A/D conversion and D/A conversion, digital operation and self-diagnosis. The memory 21 has ROM's (read-only memories) 21a, 21b and RAM (random access memory) 21c. ROM 21a is a memory in which a system program is stored. The system program is a fixed program consisting of an executive program to control an overall operation of the controller, an input/output signal processing program, an operation processing program, a data display program, a self-diagnosis program and a library for auxiliary operation and control operation. The system program includes three control operation programs represented by basic control function program BSC, cascade function program CSC and selective control function program SSC for deciding the control operation function. ROM 21b is a memory in which a user program is stored. The user program is that in which data on auxiliary operation, control operation and fixed operation constant necessary therefor and display and initial values for tuning of control parameters such as P, I, D are prepared at every job. ROM 21b is therefore mounted on the data bus 15 replaceably with a socket 28. RAM 21c of the memory 21 is a memory to be used for operation and temporary storage of data and provided, as shown in FIG. 3, with analog input registers X1~X5, digital input registers DI$_1$~DI$_3$, variable constant registers P1~P8, operation registers S1~S5, analog output registers Y1~Y3 and digital output registers DO1~DO3, with backup by battery 29.

Figure 4:
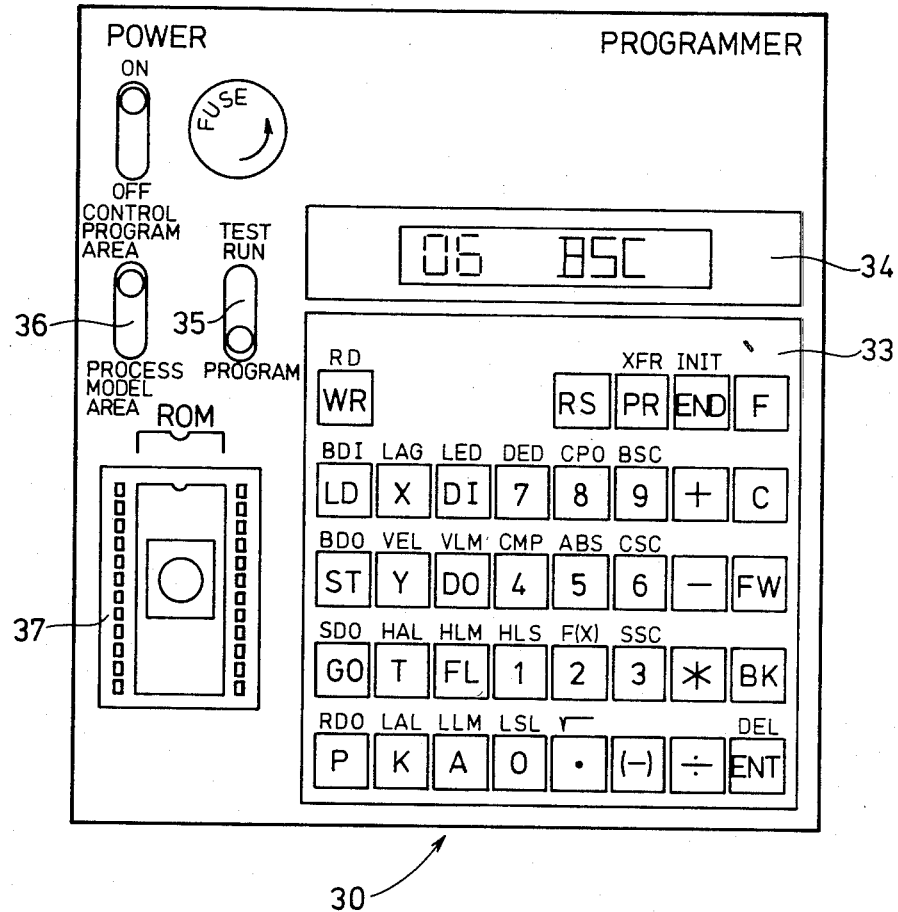
FIG. 4 is a front view of a programmer of a controller according to the invention.

A programmer 30 has ROM 31 in which programs to control a programming operation, RAM 32 in which generated user programs are stored temporarily, and a panel interface 38 for program keyboard 33, display 34, operation mode switch 35, program area specifying switch 36 and ROM writer 37 on the front panel, these being connected through a data bus 39. The data bus 39 for the programmer 30 is connected to the data bus 15 for the controller body 10 with a connector 50, thus the programmer 30 being connected detachably to the controller body 10. There are provided on a keyboard 33 of the programmer 30, as shown in FIG. 4, LOAD instruction key LD for input reading, STORE instruction key ST for outputting operation results, instruction key END to indicate a program end, GO TO instruction key GO to jump a program over to a specified step, register specifying keys X, Y, K, P, DI, DO, A, FL, register keys 0~9, decimal point key., code key (—), RESET key RS to force a programmer operation to a start point, CLEAR key C to erase indication on the way to key-in, FORWARD key FW to advance a program display by 1 step and BACKWARD key BK to return it 1 step before, INITIAL PROGRAM key INIT to erase a program stored in RAM 32 of the programmer, TRANSFER key XFR to transfer a user program stored in ROM 21$b$ of the controller body 10 to RAM 32 of the programmer 30, WRITE key WR to copy contents of RAM 32 to ROM inserted in a ROM writer 37, READ key RD to read contents of ROM inserted in the ROM writer 37 in RAM 32 of the programmer 30, PRINTER key PR to print contents of RAM 32 on an ancillary printer, DELETE key DEL to delete a program displayed on a display 34 by 1 line and carry an ensuing program by 1 step, ENTER key ENT to store numeric values including fixed constant after key-in, keys working as FUNC instruction keys to execute operations which correspond, as shown in FIG. 5, individually to operation functions such as arithmetic operation, signal conversion, selector, limiter, dynamics, condition decision and digital output, basic control function key BSC to decide a control operation function, cascade control function key CSC, and selective control function key SSC. To minimize a private area of the front panel, each key is arranged as shown in FIG. 4, functioning accordingly upon depressing a function switching key F. Further, the display 34 is constituted of an 8-digit 16-segment light emitting element.

Figure 6:
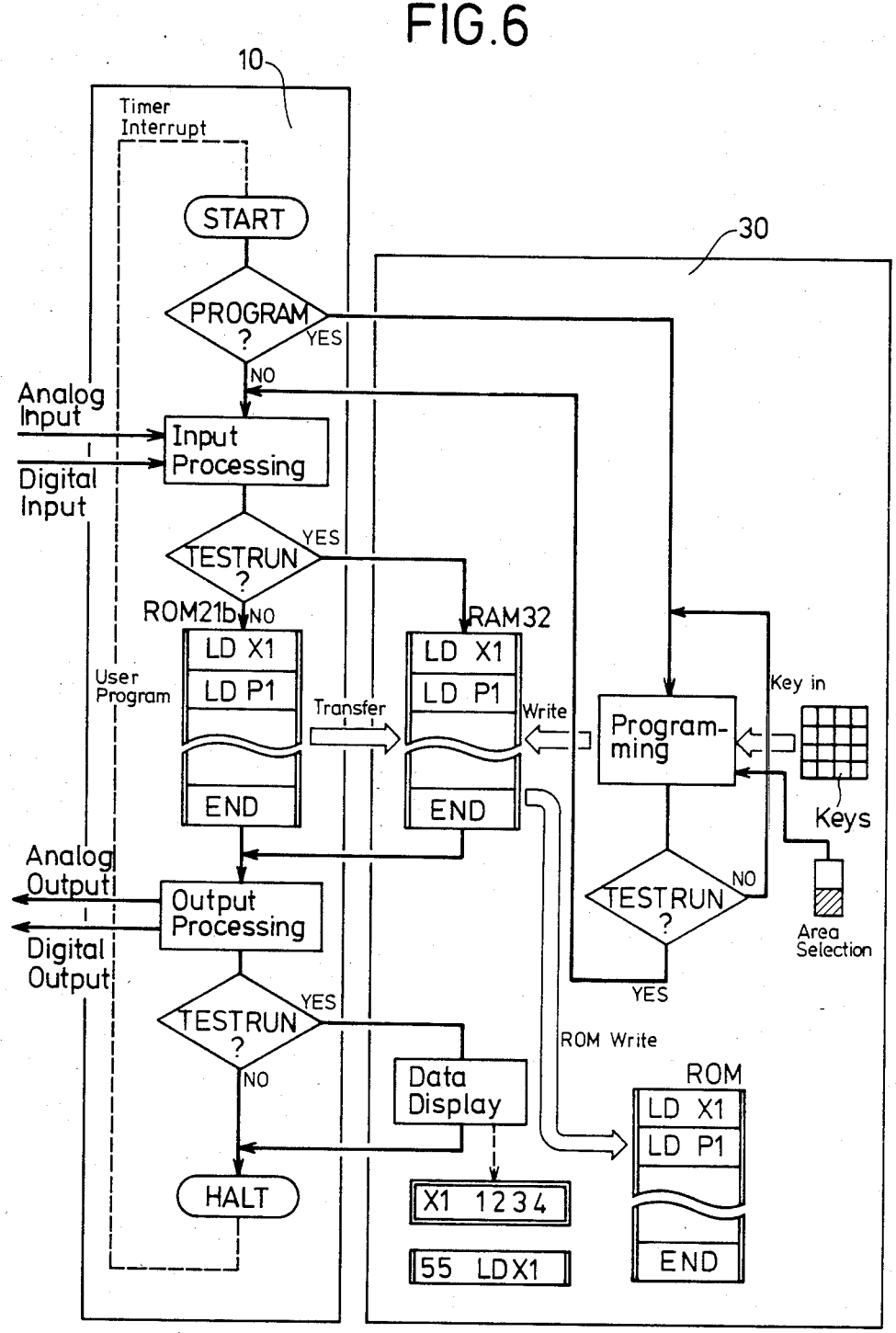
FIG. 6 is a flowchart illustrating performance of a controller according to the invention.

In the present invention thus constituted, operations of the controller body 10 and the programmer 30 are all effective under control of CPU 13. Contents of the control are specified by the system program stored in ROM 21$a$. When a power supply is closed, peripheral circuits are initialized for a given period of time. Next, CPU 13 decides, as shown in flowchart of FIG. 6, whether or not the programmer 30 is connected. In case the programmer 30 is not connected, a mode comes in executing operation in accordance with the user program stored in ROM 21$b$; in case the programmer 30 is connected, a program mode to generate the user program and a test run mode to carry out the test are selected by the operation mode switch 35 of the programmer 30.

Figure 7:
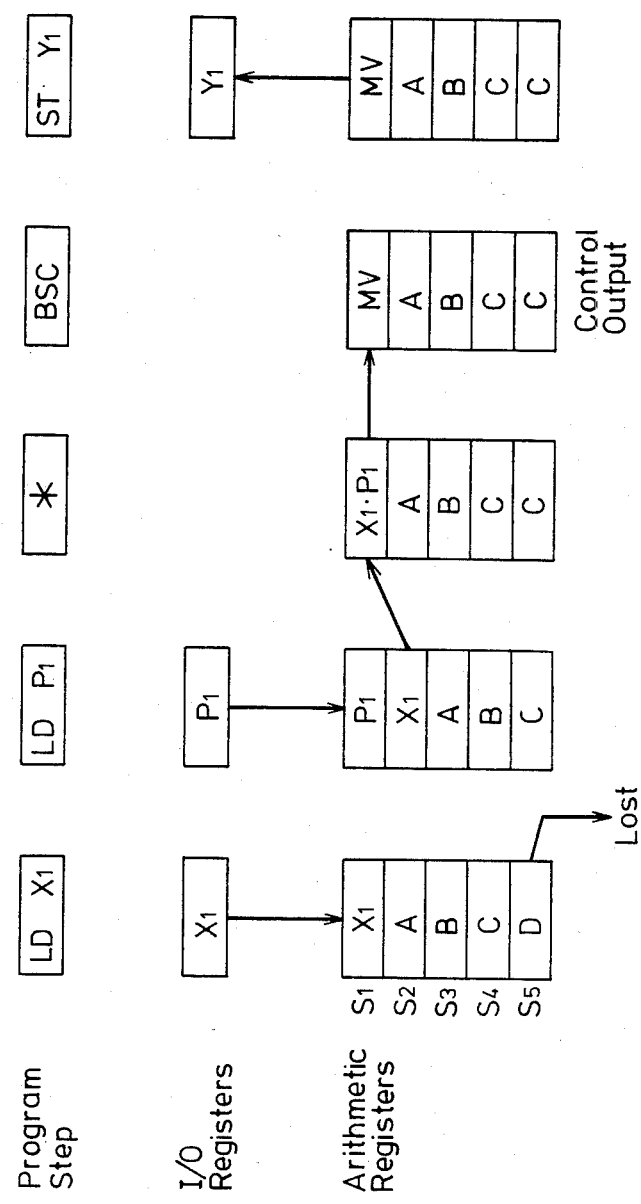
FIG. 7 is a performance diagram of operation registers of a controller according to the invention.
Figure 8:
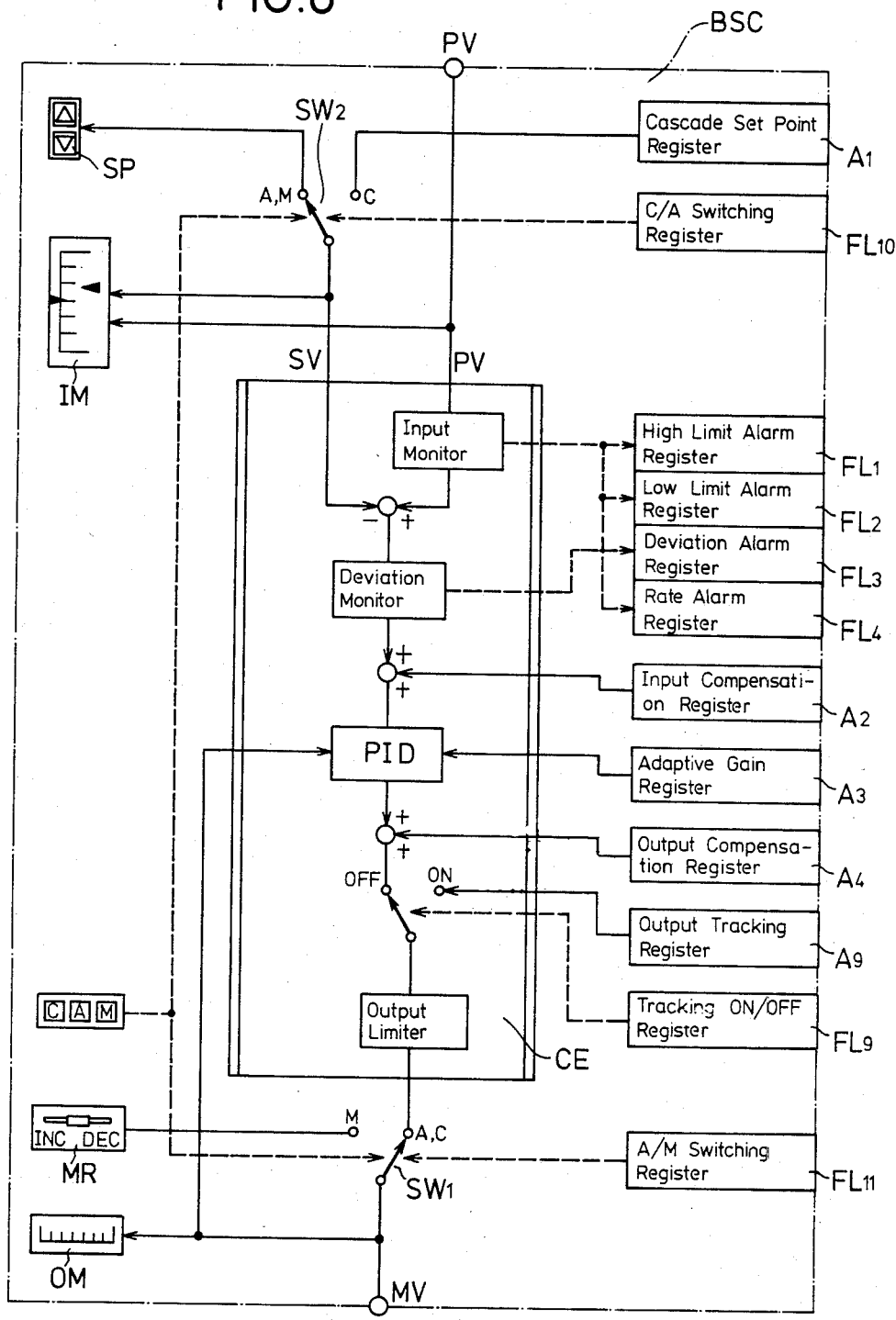
FIG. 8 is a block diagram showing a constitution of basic control function of a controller according to the invention.

EXECUTION MODE

Where the programmer 30 is not connected to the controller body 10, a mode is given in execution mode to execute the user program stored in ROM 21$b$ connected to the socket 28. In the execution mode, analog inputs $E_{i1}$~$E_{i5}$ are selected sequentially by the input multiplexer 11 to A/D conversion. Each signal through A/D conversion is normalized and stored in an exclusive input register. On the other hand, digital inputs (contact signals) are also read and stored in exclusive input registers. After all the input data are stored in the input registers, auxiliary operation and control operation are then executed according to the user program stored in ROM 21$b$ through combining libraries for arithmetic operation, logical operation and dynamic operation in the system program. For operation according to the user program, operation registers S$_1$~S$_5$ are used in common. Inputting from exclusive registers of the input registers to operation registers is carried out according to LOAD instruction. The operation registers S$_1$~S$_5$ are given in a stack construction as shown in FIG. 7, and a data is pushed down from S$_1$ to S$_2$ whenever it is inputted by LOAD instruction. An operation on the inputted data is performed by FVNC instruction. The operation is performed by using data in the necessary number of operation registers, and the result is outputted to the top operation register S$_1$. Other data in the operation registers are also hopped up each in accordance therewith. An output connection to fetch the operation result and store it in exclusive register of the output register is carried out by STORE instruction. No change will result in contents of the operation registers S$_1$~S$_5$ from executing STORE instruction. A function program that can be selected by the FUNC instruction of the user program includes, besides the operation function programs such as arithmetic operation, signal conversion, selector, limiter, dynamics, condition decision and alarm, three function programs as well for deciding the control operation function, that is, the basic control function program BSC, the cascade control function program SSC and the selective control function program SSC. Basic control function program BSC is that of unifying functions of one unit of controller which inputs a measured value PV and outputs an operation signal MV obtained through PID operation, as shown in FIG. 8, into one operation function. Namely, in BSC, the control element CE applies a given control operation like PID to a deviation between measured value PV and set value SV and then controls upper and lower limit values with output limiter to outputting. In this case, an upper limit alarm, a lower limit alarm and a fluctuation alarm of the measured value PV are ready by input monitor and a deviation alarm is ready by deviation monitor. Manual/automatic changeover switch SW$_1$ changes an output of CE and output of manual actuator MR to an operation output MV. An automatic operation mode and a manual operation mode can be changed by depressing operation mode changeover pushbutton A or M. To carry out the switching in balanceless and bumpless manner, the operation output MV is given to the control element CE as tracking signal. Then, measured value PV, set value SV and operation output MV are displayed on displays IM, OM. Furthermore, a switch SW$_2$ with which to change internal setting and external setting is provided so that the set value can be set externally, and SW$_2$ is changed over to external setting side by depressing a pushbutton C of the operation mode changeover button SM. This can be done also in bumpless manner. At the time of internal setting, SV can be modified by a set value alteration button SP. Then for BSC, there are provided a cascade setting register $A_1$ for cascade input, an input compensation register $A_2$ for dead time compensation control, a variable gain register $A_3$ for variable gain control, an output compensation register $A_4$ for feed forward operation and an output tracking register $A_9$ to store output tracking input; the control operation is obtainable immediately by connecting suitable data to these registers, as occasion demands, according to STORE instruction of the user program. For BSC, furthermore, there are also provided an upper limit alarm register $FL_1$, a lower limit alarm register $FL_2$, a deviation alarm register $FL_3$ and fluctuation alarm register $FL_4$ for alarm signals coming from input or deviation monitor; and alarm status can be outputted by connecting to digital output registers $DO_1 \sim DO_3$ according to STORE instruction of the user program. Further provided are a tracking control inputting register $FL_9$ for output tracking, a C/A switching register $FL_{11}$ for manual/automatic switching. Then, an initial value to invalidate the function program is written normally in these registers A and FL, therefore there need not be conscious of a presence of the registers when they are not put to use. Various control operations such as PID operation, PID operation with batch and sample value PI operation can be assigned to the control element CE.

Figure 9:
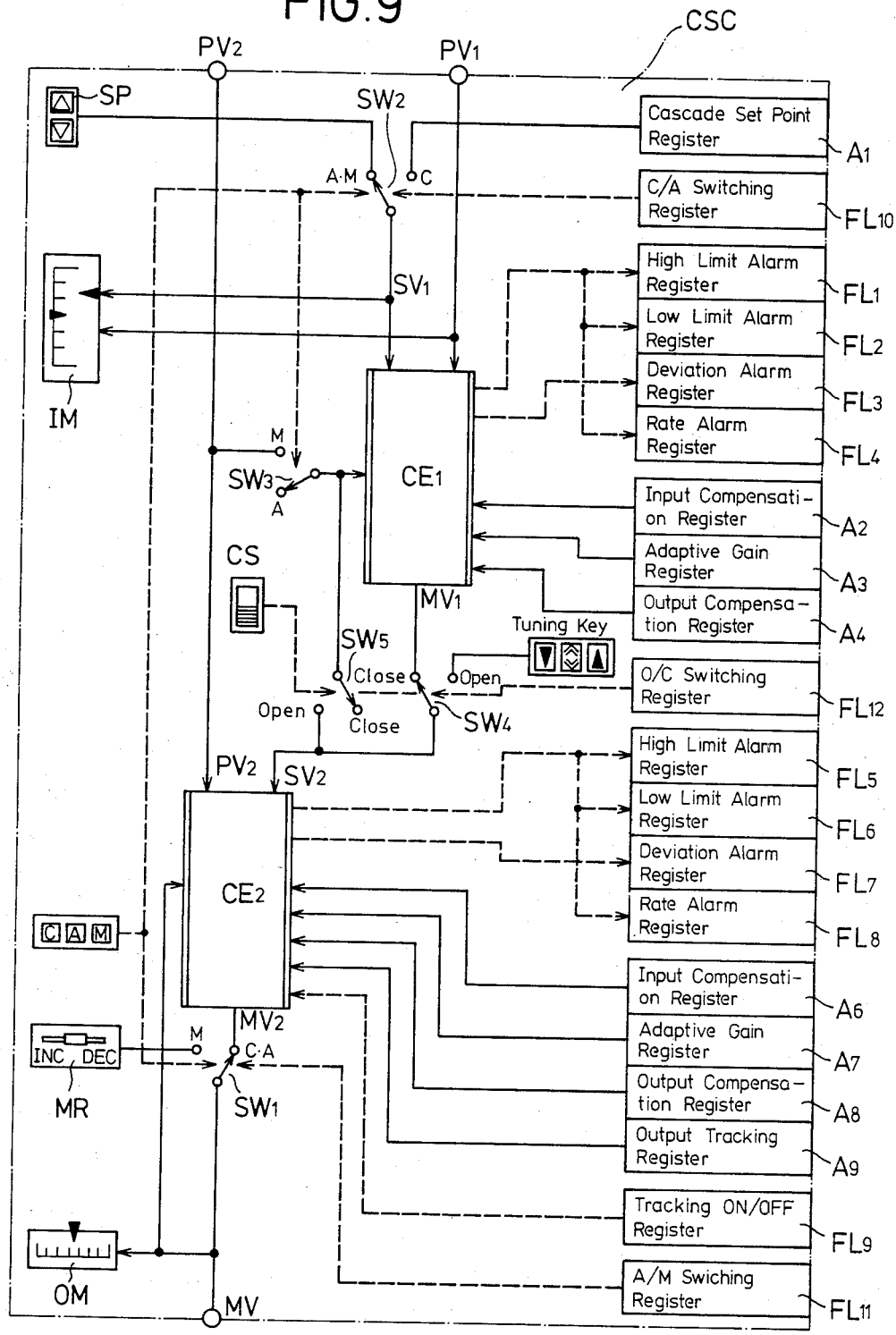
FIG. 9 is a block diagram showing a constitution of cascade control function of a controller according to the invention.

CSC is a cascade control function program, for which a function program necessary for cascade control with two process controllers connected in series as shown in FIG. 9 is standardized. Namely, a given control operation is applied to a deviation between measured value $PV_1$ and set value $SV_1$ by a control element $CE_1$ on primary side, and an output $MV_1$ limiting upper and lower limit values is given to a control element $CE_2$ on secondary side as a set value $SV_2$. $CE_2$ applies a given control operation to a deviation between measured value $PV_2$ and set value $SV_2$ and generates an output limiting upper and lower limit values. This output works as an operation output MV at the time of automatic operation mode. Then, manual/automatic balanceless and bumpless switching, displays of measured value $PV_1$, set value $SV_1$ and operation output MV and internal/external switching of the set value $SV_1$ are processed in the same way as basic control function BSC. In CSC a constitution is such that the measured value $PV_2$ on secondary side is subjected to tracking by $CE_1$ on switch $SW_3$ when the operation output MV is kept in manual status; further when control parameters of $CE_2$ on secondary side are subjected to tuning by means of keyboard KY on the side panel 19, $CE_1$ and $CE_2$ are isolated on switch $SW_4$, and they are subjected to tracking to the set value $SV_2$ of $CE_2$ on switch $SW_5$ so as to keep the output of $CE_1$ from being saturated. Then, $CE_1$ and $CE_2$ are isolated on a cascade open/close changeover switch $CS_7$. From turning $CS_7$ to open side, a series of operation to isolate $CE_1$ and $CE_2$ is ready automatically. Further, a control operation to be executed by $CE_1$ and $CE_2$ can be designated from among PID operation, PID operation with batch and sample value PI operation as in the case of BSC. There are provided register A and register FL as in the case of BSC so that an input compensating signal and an output compensating signal can be given externally to $CE_1$ and $CE_2$ respectively and also a tracking input and a tracking contact input can be given externally to $CE_2$. There further provided is a C/S switching register $FL_{12}$ so as to isolate $CE_1$ and $CE_2$ according to the user program.

Figure 10:
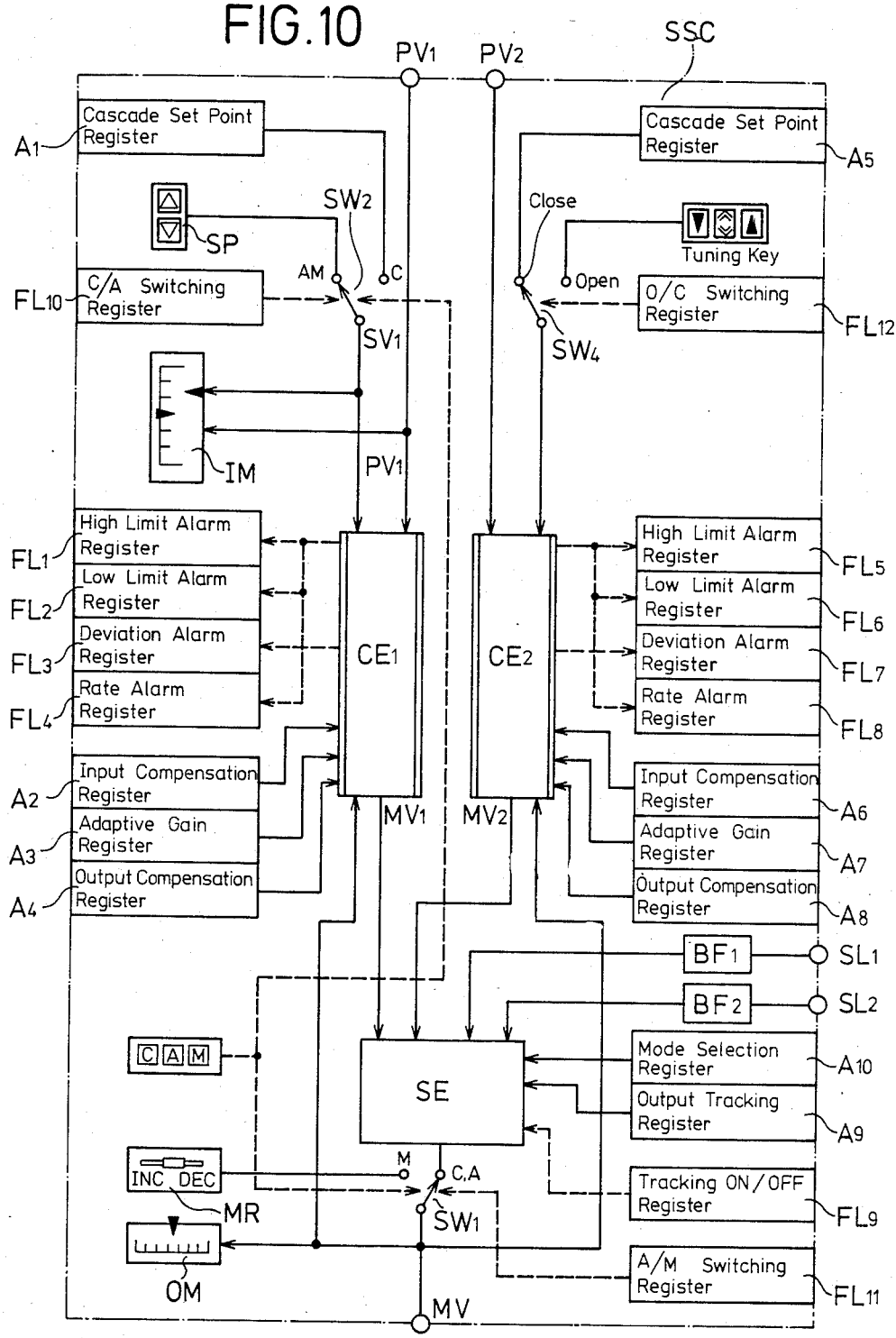
FIG. 10 is a block diagram showing a constitution of selective control function of a controller according to the invention.

SSC is a selective control function program, for which two process controllers are connected in parallel and a function program necessary for selective control of four signals including the third and fourth inputs is standardized, as shown in FIG. 10. Namely, a selecting element SE will select one of outputs $MV_1$, $MV_2$ of the two control elements $CE_1$, $CE_2$ and inputs $SL_1$, $SL_2$ incoming externally according to user's designation. For the selecting element SE, there are modes such as maximum value selecting mode, minimum value selecting mode, $MV_1$ selecting mode, $MV_2$ selecting mode, $SL_1$ selecting mode, $SL_2$ selecting mode, and these modes can be selected according to an external mode select signal (user programmable). Then, $SL_1$ and $SL_2$ are given to the selecting element SE through buffers $BF_1$, $BF_2$, and the operation output MV can be given to the buffers $BF_1$, $BF_2$ as a tracking signal for bumpless switching. MV is given to $CE_1$, $CE_2$ as a tracking signal. Measured value $PV_1$ of $CE_1$ and set value $SV_1$ are displayed on the display IM, and the operation output MV is displayed on the display OM. Set value $SV_1$ of $CE_1$ can be changed internally and externally on the switch $SW_2$. Further, register A and register FL are provided, as in the case of BSC and CSC, so that input compensating signal and output compensating signal can be given externally to $CE_1$ and $CE_2$. Various control operations can be designated for $CE_1$, $CE_2$ as in the case of BSC and CSC.

Thus in the present invention, there are provided single loop basic control function program, cascade control function program and selective control function program which are standardized as a control operation division, each control function being effective as one instruction of the program, and a program can therefore be generated in the sense of selecting a conventional analog controller.

Figures 11, 12:
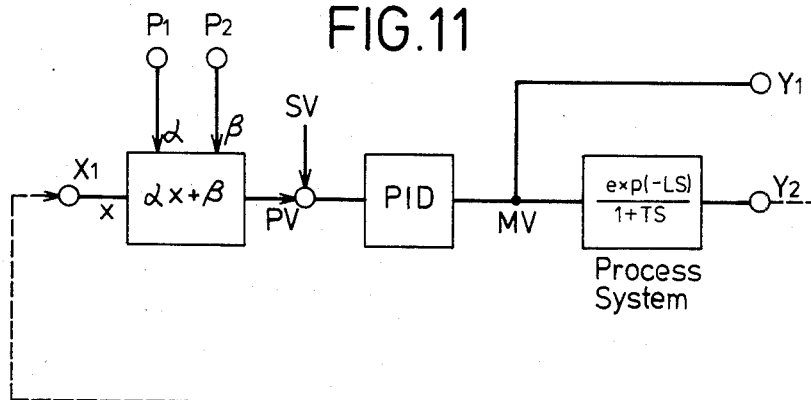
FIG. 11 is an instrumentation flowchart showing a control system illustrative of a user program of a controller according to the invention.
FIG. 12 is a diagram of a user program for the control system of FIG. 11 and the key operation therefor.
Figure 13:
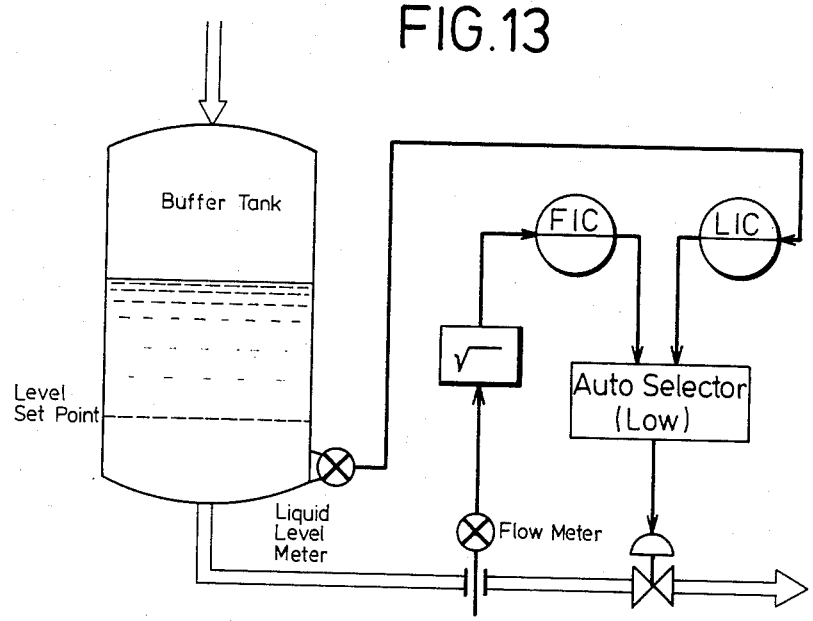
FIG. 13 is an instrumentation flowchart of a flow control system for buffer tank to which a controller according to the invention is applied.
Figure 14:
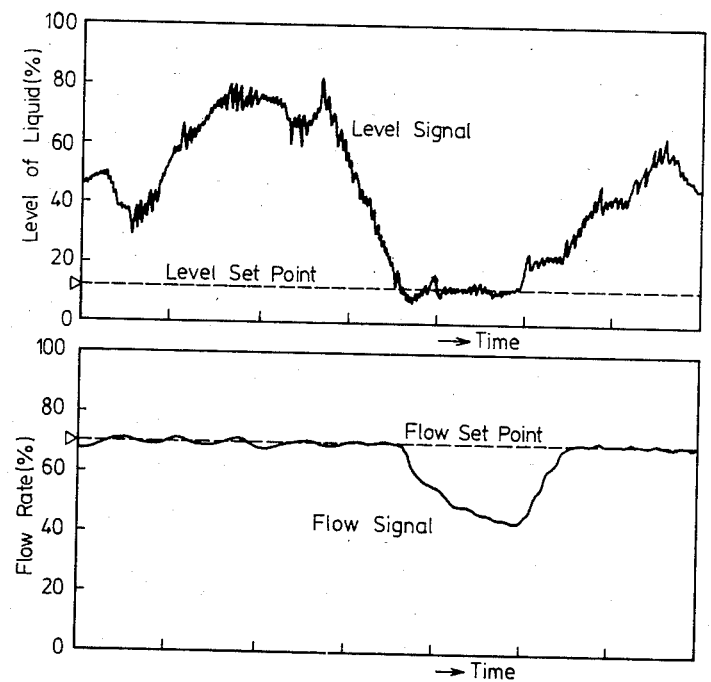
FIG. 14 is a characteristic diagram showing a correlation between liquid level and flow of the buffer tank when the control system of FIG. 13 is subjected to an auto-selector control.
Figures 15, 16:
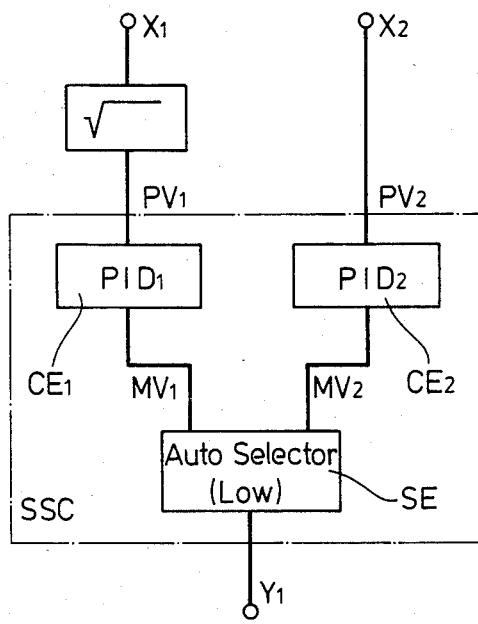
FIG. 15 is a block diagram of operation and control when the control system of FIG. 13 is controlled by a controller according to the invention.
FIG. 16 is an example of the user program corresponding to FIG. 15.

As will be apparent from instrumentation flowchart of FIG. 11, a user program will be given as shown in FIG. 12 in a control system wherein an input x from a process system is multiplied by a constant $\alpha$, a value $\alpha x + \beta$ obtained through adding a bias $\beta$ thereto is taken as measured value PV, and PID operation is applied to a deviation with an internal set value SV, thus obtaining operation output MV. In FIG. 12, $\boxed{LD}\ \boxed{X}\ \boxed{1}$ represents read of input x stored in input register $X_1$, $\boxed{LD}\ \boxed{P}\ \boxed{1}$ read of constant $\alpha$ stored in constant register $P_1$, $\boxed{*}$ multiplication of x by $\alpha$, $\boxed{LD}\ \boxed{P}\ \boxed{2}$ read of constant $\beta$ stored in constant register $P_2$, $\boxed{+}$ addition of $\alpha x + \beta$, $\boxed{BSC}$ applying PID operation to a deviation with internal set value SV with $\alpha x + \beta$ as measured value PV, which just corresponds to a conventional analog PID controller. $\boxed{ST}\ \boxed{Y}\ \boxed{1}$ then represents write of manipulated variable MV resulting from control operation in output register $Y_1$, $\boxed{END}$ end of a program. To describe the user program more concretely, an outflow control system for buffer tank will be taken up as follows:

In the case of outflow control system for the buffer tank, a principal object is to keep a flow constant, however, the buffer tank liquid level must not be allowed to come below a permissible value. Then, a constitution of auto-selector (low selector) for flow control FIC and level control LIC (a set value being specified at a permissible lower limit value of the level) as shown in instrumentation flowchart of FIG. 13 may lead, in most cases, to a better control result. In the auto-selector control, flow control is selected in a steady state to keep outflow constant, and when the level comes near to a lower limit value due to decrease in tank inflow, operation output for the level control is selected automatically, the level is thus prevented from lowering, and a relation between level and outflow of the buffer tank stands as shown in FIG. 14. In such an outflow control system for the buffer tank, selective control function program SSC is selected, a block diagram of the operation and control is given in FIG. 15, and a user program is as shown in FIG. 16. Namely, a main flow signal from a flow meter which is read in input register $X_1$ is operated for extraction of the square root to measured value $PV_1$ of the first control element $CE_1$ of SSC. The measured value $PV_1$ and set value $SV_1$ of $CE_1$ are indicated on an indicator IM of the front panel 17, the set value $SV_1$ being alterable by set value adjusting push-button SP on the front panel 17. A level signal from a level indicator which is read in input register $X_2$ is taken as measured value $PV_2$ of the second control element $CE_2$ of SSC, and a set value is given by variable constant setting push-button PN on the side panel 19. Then, outputs $MV_1$, $MV_2$ of both the control elements $CE_1$, $CE_2$ have a smaller one selected by the selecting element SE of SSC, which works as a manipulated variable MV to be in output register $Y_1$.

Figure 17:
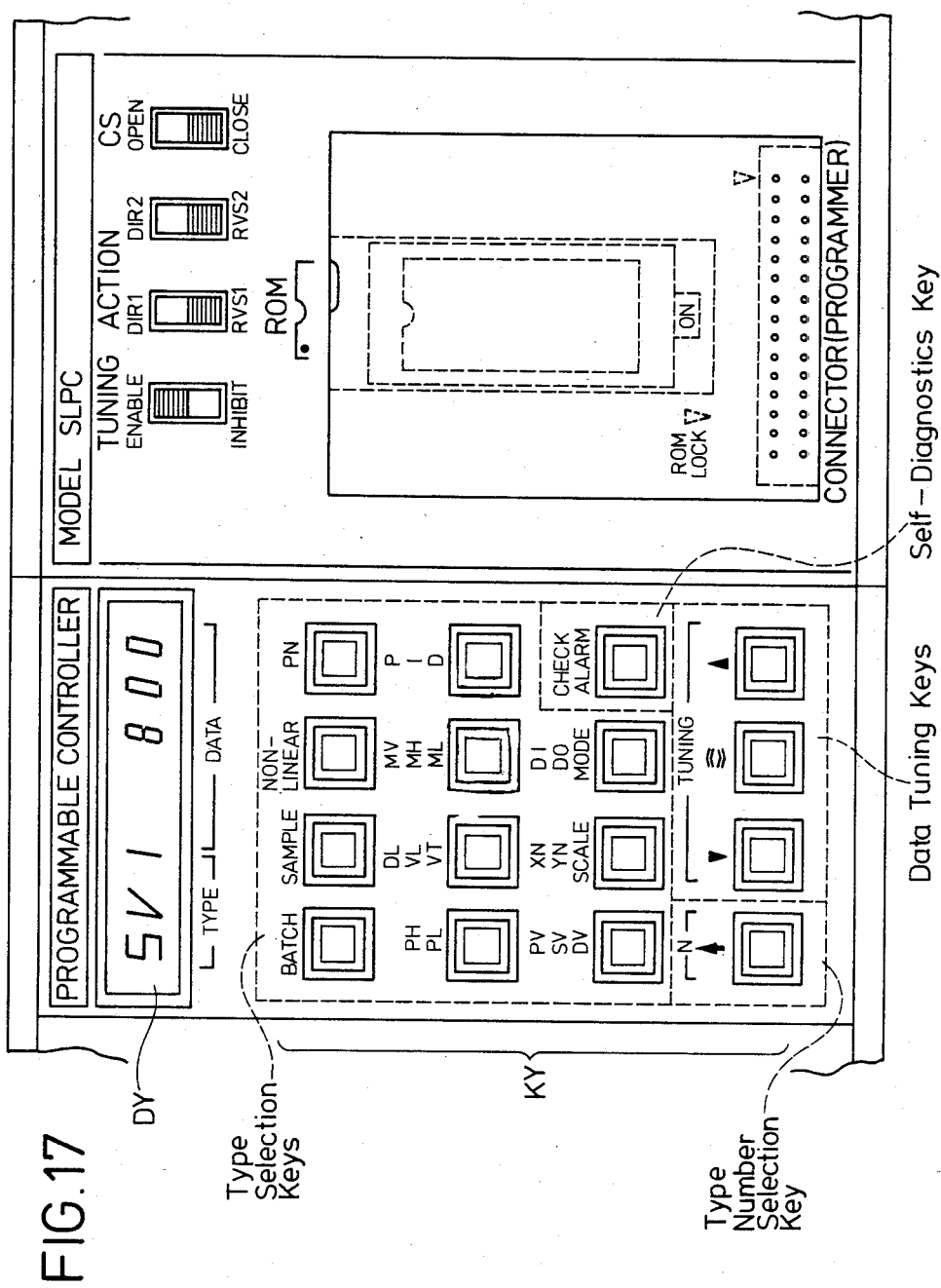
FIG. 17 is a block diagram of a slide panel of a controller body according to the invention.

After operations according to the user program, an output processing ensues. In the output processing, contents of an analog outputting register are read out in turn to D/A conversion. A result obtained through each D/A conversion is given to the output holding circuit 23 to holding. Contents of digital outputting register are also read and outputted as a contact signal through digital output interface 25. The above procedure from reading incoming signals to outputting through operations is executed repeatedly at periods of 0.2 sec., therefore a response almost not changing from the conventional analog controller is obtainable. Then, measured value PV, set value SV and manipulated variable MV stored in the output register are displayed on displays IM and OM on the front panel 17, and measured value PV, set value SV, manipulated variable MV, output limiter and various parameters are displayed selectively on display DY of the side panel 19. Namely on the keyboard KY of the side panel 19, there are provided, as shown in FIG. 17, 11 item calling keys, an item number update key, 3 data setting keys and a self-diagnosis key. And as illustrated, each item calling key has various items allocated: proportional region P, integrating time I, differentiating time D, measured value PV, set value SV, deviation value DV, operation signal MV, operation signal upper limit value MH, operation signal lower limit value ML, measured value upper limit alarm set value PH, measured value lower limit alarm set value PL, variable parameter PN, analog incoming signal XN, analog outgoing signal YN, status input DI, statys output DO, deviation alarm set value DL, non-linear control parameter NONLINER, sample value PI control parameter SAMPLE, PID parameter with batch switch BATCH. Then, by depressing a key for item to display, an alphabetic item same as the key and the data in numeric value are displayed on the display DY. Thus a character display which is self-explanatory is used instead of a conventional numeric code for the contents to display, which is effective to minimize a possibility of erroneous operation or misconception, thereby improving operating efficiency. In case then where a plural item is allocated to the same key, to depress the key is to change the item in each occasion. For example, the item changes as PV→SV→DV→PV at every depression of the key having the items of PV, SV, DV allocated thereto. Then, the item number update key N is for updating item numbers: the item number changes as X1→X2→X3→X4→X5→X1 at every depression of the key N where, for example, an item XN is called. The data setting key is for adjusting the data of an item sellected by the item calling key, which includes data increment setting key ▲ , data decrement setting key ▼ and acceleration setting key ↕ (operating simultaneously with ▲ or ▼ ). Further, there allocated for the self-diagnosis key are CHECK to display a cause of abnormity in code on the display $DY_1$ when the fail lamp $LP_1$ lights up and ALARM to display a cause of alarm in code when the alarm lamp $LP_2$ lights up. Then on the side panel 19, a set inhibiting slide switch TUNING and a controller normal/reverse operation changing slide switch ACTION are provided in two to cope with the built-in two control elements $CE_1$, $CE_2$. A switch CS to specify isolation of $CE_1$ and $CE_2$ at the time of CSC is provided further thereto.

Control parameters of P, I, D are subjected to fine tuning by operating the keyboard KY on the side panel 19 at the time of execution mode, however, they disappear when RAM 21c volatilizes for the battery 29 coming off when a supply for the controller is turned off. If the controller supply is turned on with the battery 29 kept off in this case, a tuning initial value written in ROM 21b is set automatically on RAM 21c under decision that RAM 21c has volatlized. The tuning initial value written in ROM 21b is then a value of the control parameter tuned roughly at the time of test run mode described hereinafter. Thus in the present invention, an arrangement is such that tuning initial values of the control parameters of P, I, D are written in ROM 21b in which the user program is stored, which can be reset automatically when RAM 21c has volatilized, therefore the parameters need not be reset manually, and any selected value can be stored as tuning initial value, thus allowing the unit to restart quickly and safely when RAM 21c has volatilized.

A means with which to carry out A/D conversion on the controller body 10 can be that for which a comparator and D/A converter 22 are used as described in U.S. Pat. No. 4,141,065. Further, the internal register of CPU 13 can also be used for operation register.

PROGRAM MODE

Figure 18:
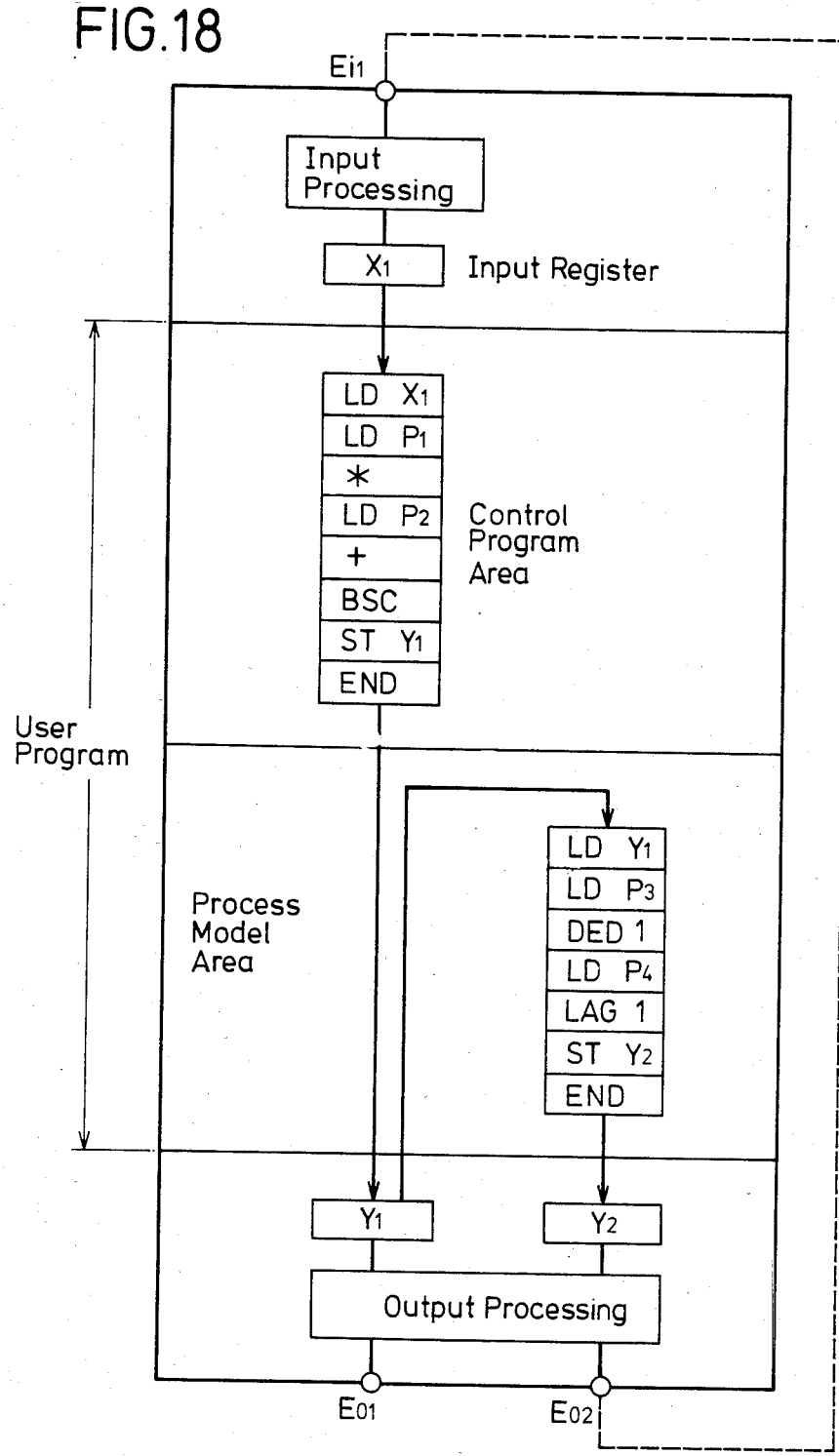
FIG. 18 is a performance diagram illustrative of simulation in a controller according to the invention.

The programmer 30 is connected to the controller body 10, and an operation mode switch 35 is turned to program side, thereby obtaining a program mode. In the program mode, initial values of the control parameters P, I, D written in the program controlling ROM 31 are set in a parameter region of RAM 32 by depressing initialize key INIT on the keyboard 33. The initial value is a fixed one for the system and not changeable according to jobs, therefore it is a value on safety side like P=1000%, I=9999 sec., D=0 sec. Then, in RAM 32, there is a process model area for simulation at test run mode separately from a control program area for control operation as shown in FIG. 18, and in the program mode an area designation switch 36 is to take which area to write in. The control program area is designated by the area designation switch 36, and a control program and constants shown in FIG. 12 for example are keyed in from the keyboard 33. Namely, a programming is capable of obtaining an instruction to read analog input x of step 01 by depressing LOAD instruction key LD, register designation key X and register key 1 successively after resetting the program written in RAM 32 through depressing reset key RS. Next, an instruction to read a constant α of step 02 is obtained by depressing LOAD instruction key LD, register designation key P and register key 1 successively. An instruction to execute an operation of αx of step 03 is obtained by depressing FUNC instruction key *. These key operations are converted into instruction codes on CPU 13 of the controller body 10 according to the program stored in programming controlling ROM 31 and then written in control program area of RAM 32. A program can thus be generated easily through operation as in the case of desk calculators by key operations in the sequence given in FIG. 12 at every step. Contents of the program at every step are displayed, as shown in FIG. 19, on display 34, and particularly each instruction is displayed in a program symbol corresponding fairly to the display on the keyboard, therefore the program can be generated very easily. Further a constitution is such that each step of the program moves to the next by depressing any of the instruction keys. Thus a compound operation can be executed simply by combining three kinds of instructions LOAD, FUNC and STORE, and moreover the three instructions LOAD, FUNC, STORE are given in a flow running along a physical operation procedure of a conventional individual operator to an easy understanding consequently, therefore an instrumentation flowchart written in a signal flow in the majority of cases can easily be converted into program. (There may be a case where a numerical description like FORTRAN, BASIC is hard of representation.) Since an operation result pops up to $S_1$ at all times, the operation can be kept going immediately simply by loading an additional data necessary for the next operation, and the program comes mostly in two kinds of instructions LOAD and FUNC to a simple constitution. Thus a programmer is not bound to a knowledge on software for computers and capable consequently of operating process input/output as observing the instrumentation flowchart under procedures as in the case of desk calculators. Users can therefore compose a program simply without disclosing a know-how on the control.

Next, a fixed operation constant will be set, as shown in FIG. 20(a), by depressing register designation key K, designating the number of fixed register through operation of the register key and then operating the register key accordingly. The set value is confirmed on the display 34 and if satisfactory, then it is written in RAM 32 by depressing entry key ENT. Where the constant is negative, a polarity designation key (−) is operated as shown in FIG. 20(b). Then, an engineering data is displayed on the display 34 with an upper limit value of the display data in H and a lower limit value in L as shown in FIG. 21. A switching of H and L is carried out by depressing the entry key ENT. If data of $X_1$ is 0.3, then there displayed is −30.0 on the display DY at side of controller body 10, in this case.

A condition decision function is that of branching programs through a relative decision on ON/OFF of digital input/output and analog signal level, which is capable of executing sequence operation in combination with GOTO instruction.

Next, an area designation switch 36 is switched to process model program side, and a model to control necessary for simulation, or algorithm like dead time +- primary lag system shown in FIG. 11 is programmed on the keyboard 33. The result is coded and then stored in a process model area of RAM 32. The area is normally initialized in END status to have no operation therein, therefore if a test is not necessary, no program will have to be written. In a process model area of FIG. 18, $LDY_1$ represents a reading of data $Y_1$ stored in output register $Y_1$, $LDP_3$ a reading of constant L stored in constant $P_3$, DED an operation to apply dead time $e^{-LS}$ to $Y_1$, $LDP_4$ a reading of constant T stored in constant register $P_4$, LAG an operation to apply primary lag $1/(1+ST)$ to $Y_1 e^{-LS}$, $STY_2$ a writing of operation result $Y_1 e^{-LS}/(1+ST)$ in output register $Y_2$, and END an end of program step.

TEST RUN MORE

Upon changing the operation mode switch 35 to test run mode side after programming is over, the controller body 10 is given in a test run mode ready for executing control program and process model program stored in RAM 32. Therefore a result of the control program is once outputted, as shown in FIG. 18, to output register $Y_1$, and contents of $Y_1$ are outputted to output register $Y_2$ through process model program, thus obtaining a response of open loop of the process on output end. Specifications of the program algorithm can be confirmed under the status. Next, a terminal to output analog output $E_{02}$ (contents of output register $Y_2$) of the controller body 10 is connected to a terminal through which analog input $E_{i1}$ is inputted, thereby forming a close loop including the process model, and the controller body 10 executes a simulation of feedback control in FIG. 18. A control operation of the control program can be confirmed and the control parameter can be adjusted roughly under the status. In the present invention a technique of the process simulation is thus standardized, and the process model is made programmable to allow any selected model therein, for which a special simulator is not required, therefore tests can be carried out very easily.

Then on the display 34 of the programmer, a value of each register in operation is selected through key operation and displayed in numerical character. To display a value of the input register $X_1$, for example, the register designation key X and the register key 1 will be simply depressed. Then fixed operation constant can be altered by key operation, therefore it can be set at an optimal value as executing the program. Since the programmer functions as a digital display for the register value at the time of test run mode, the program can be checked for availability in a short time simply by observing the display 34, and if there is found something insufficient, it can be modified through returning immediately to the program mode.

Figure 22:
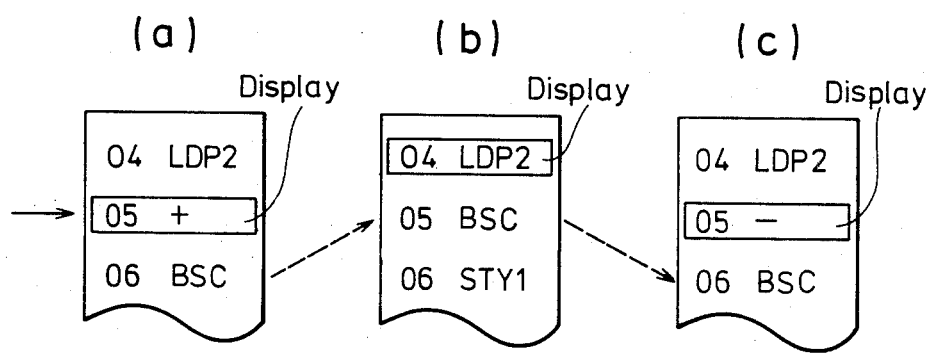
FIG. 22 is a diagram of a user program correcting operation in a controller according to the invention.

For modification of the program, the step number to modify is selected by depressing program step forward key FW or backward key BK in the necessary number of times, delete key DEL is depressed to delete the instruction, and then an instruction to modify is written through key operation. In case, for example, a step 05 in FIG. 22(a) is to be modified to subtraction − from addition +, the step 05 is selected by operating the key FW or BK, and from depressing the delete key DEL, an instruction + is deleted as shown in FIG. 22(b), an instruction BSC for step 06 moves to 05, and thus a deleting operation is carried out to carry the following steps by one in turn. In this case, an instruction for step 04 is displayed on the display 34. Next, from depressing the subtraction key — for instruction to modify, an instruction — is added to the step 05 as shown in FIG. 22(c), the instruction BSC for the step 05 moves to 06, and an adding operation is carried out to carry down the following steps by one in turn. In this case, an instruction for the step 05 is displayed on the display 34. Thus the program can be modified easily by deleting operation, adding operation and combined operation thereof. Next, for rough adjustment of the control parameter, parameters P, I, D etc. are subjected to tuning on keyboard DY of the controller body 10. The previous initial value is updated in a parameter area for RAM 32 of the programmer 30 by the tuning and stored as a tuning initial value in registers $P_1 \sim P_8$ used exclusively for variable parameters of RAM 21 of the controller body 10. Upon completion in confirmation of the program operation for RAM 32 and adjustment of parameters, ROM is inserted in ROM writer 37 and ROM write key WR is depressed to copy contents of the program written in RAM 32 and tuning initial values of the control parameters to ROM. Then ROM works as ROM 21b storing subprograms for the controller body 10. When the programmer 30 is isolated from the controller body 10, the controller body 10 is ready for operation in execution mode, and only the programs of user programs which is written in the control program area is executed by the controller body 10 independently.

Then, the programmer 30 has a function to copy contents of the user program stored in ROM 21b of the controller body 10 to RAM 32 by depressing a transfer key TRANS at the time of program mode. Therefore, the user program can be modified partly by modifying the contents copied to RAM 32. Further, a program stored in RAM 32 can be printed on an ancillary printer by depressing printer key PR. And contents of ROM set on the programmer can also be copied to RAM 32 by depressing ROM read key READ.

Then, as a means to copy a program composed on the programmer to ROM, intermediate media like paper tape, magnetic card, etc. can be used instead of carrying it out on the programmer directly as described above.

We claim:

1. A programmable controller comprising a controller having a data bus, a microprocessor coupled to said data bus, a first ROM coupled to said data bus for storing a system program, a second ROM coupled to said data bus for storing a user program, a first RAM coupled to said data bus for storing data, said second RAM being removably connected with a socket to said data bus, a display unit having front panels for displaying measured and set value operating outputs, means for specifying the operating mode and means for changing the set value and manual operation of the output, a programmer removably connected to said controller having a second RAM for storing said user program, a third ROM for storing a control program, a keyboard for use in programming, a programmer display for use in programming, and a changeover switch for changing said programmer from a program mode to a test run mode, whereby said programmer, when connected to said controller, may be switched from a program mode for writing the user program in the second RAM using said keyboard to the test run mode for said controller thereby executing the user program written in said second RAM and checking such execution using said programmer display whereas said controller executes the user program stored in said second ROM when said programmer is disconnected from, said controller, said system program of said controller being provided with a basic function program equivalent to the function performed by a cascade controller having two process controllers connected in series, a selective control function program equivalent to the function performed by a selective type controller having a plurality of process controllers connected in parallel, whereby a control operational function of the controller is determined by selecting a control function program by a command from a user program.

2. A programmable controller according to claim 1, having an initial value of a control parameter stored in said second ROM for resetting the control parameter from said second ROM to said first RAM when the control parameter in said first RAM volatilizes.

3. A programmable controller according to claim 1, having said user program stored in said second RAM of said programmer copied in said second ROM, said second ROM being connected by said socket to said controller.

4. A programmable controller according to claim 1, wherein said programmer is provided with ROM writer means for copying the user program stored in said second RAM in said second ROM.

5. A programmable controller according to claim 1, wherein said programmer has a LOAD instruction key, a STORE instruction key and a plurality of FUNC instruction keys on said keyboard, said FUNC instruction keys having a basic control function key, a cascade control function key and a selective control function key as control functions keys to decide a control operation function, said keyboard including an arithmetic operation key and keys corresponding individually to an operation function of a selector and a limiter.

6. A programmable controller according to claim 1, wherein said second RAM of said programmer is provided with a separate storage area for storing a model program to provide a simulation of a control operation using said model program during said test run mode.

7. A programmable controller according to claim 1, wherein said programmer has a program area designation switch for designating whether a program will be written for a control operation of said second RAM or for the operation of said programmer in a model program mode.

8. A programmable controller according to claim 1, having means for transferring said user program in said second ROM to said second RAM in said programmer by means of said keyboard.

* * * * *